Aug. 17, 1937.  G. NAPOLITAN  2,090,303
HYDRAULIC BRAKE
Filed May 23, 1935  2 Sheets-Sheet 1

WITNESS:

INVENTOR.
GENE NAPOLITAN.
BY
ATTORNEYS.

Aug. 17, 1937.　　　G. NAPOLITAN　　　2,090,303
HYDRAULIC BRAKE
Filed May 23, 1935　　　2 Sheets-Sheet 2
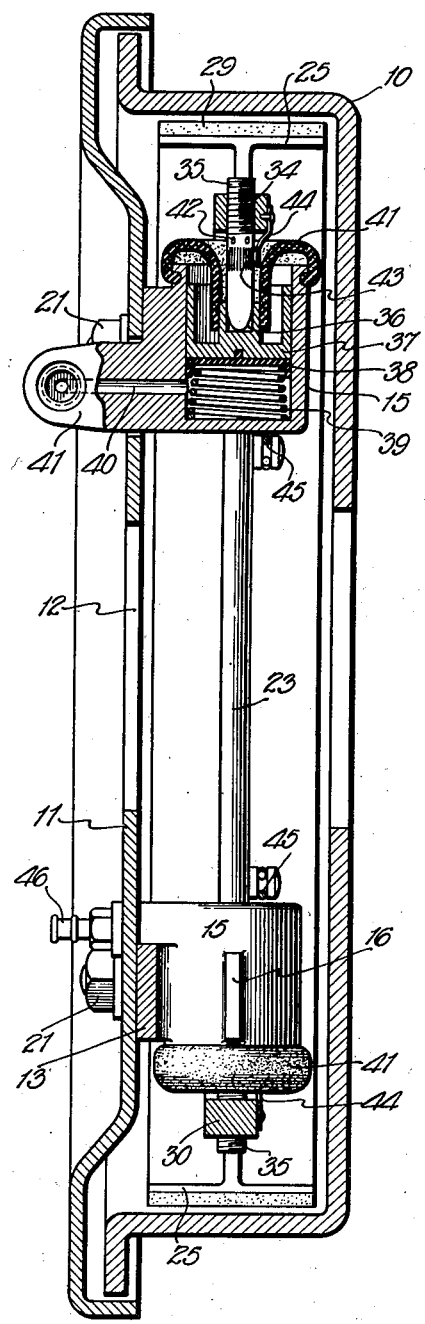
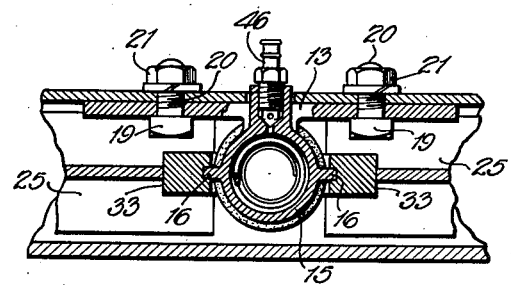
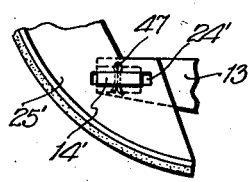
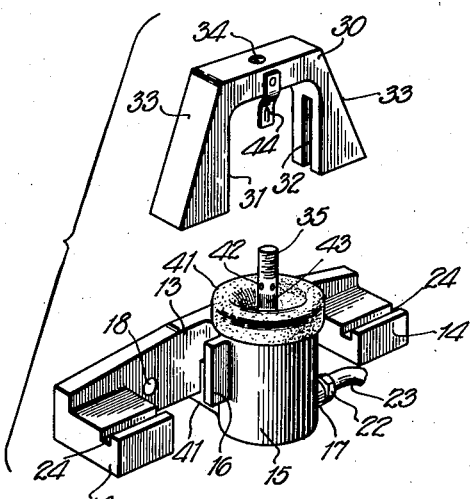
WITNESS:
INVENTOR.
GENE NAPOLITAN.
BY
ATTORNEYS.

Patented Aug. 17, 1937

2,090,303

UNITED STATES PATENT OFFICE 2,090,303

HYDRAULIC BRAKE

Gene Napolitan, Woodhaven, N. Y.

Application May 23, 1935, Serial No. 22,984

6 Claims. (Cl. 188—152)

This invention relates to improvements in vehicle brakes and more particularly to internal hydraulic actuated brakes.

One of the features of this invention is to provide a brake containing the broad principle set forth in my copending application, Serial No. 12,371, filed March 22, 1935, wherein diametrically opposed brake shoes are expanded into braking position by wedge means interposed therebetween and wherein the wedge means is operated either by hydraulic or mechanical means. However, in this improvement, the hydraulic operating cylinders forming part of the hydraulic actuating means, and the brake shoe supporting and guiding means are constructed as a unit to expedite assembly of the brake mechanism and repairs thereto, as well as facilitating the easy adjustment of the mechanism as the parts become worn.

Another feature of the invention resides in a hydraulic brake mechanism wherein the actuating parts are arranged in such novel compact manner to enable a pair of diametrically opposed brake shoes to be constructed with a braking surface to engage substantially the entire periphery of the brake drum, thereby increasing the braking efficiency of the brake to a point just short of the maximum.

With these and other objects in view which will appear as the following description is read in conjunction with the accompanying drawings;

Figure 3 is an enlarged vertical transverse sectional view on the line 3—3 of Figure 1.

Figure 4 is a detail horizontal sectional view on the line 5—5 of Figure 1.

Figure 5 is a perspective view of the hydraulic actuating means per se, and the wedge operated thereby.

Figure 6 is a detail elevational view of a modified construction.

Figure 1:
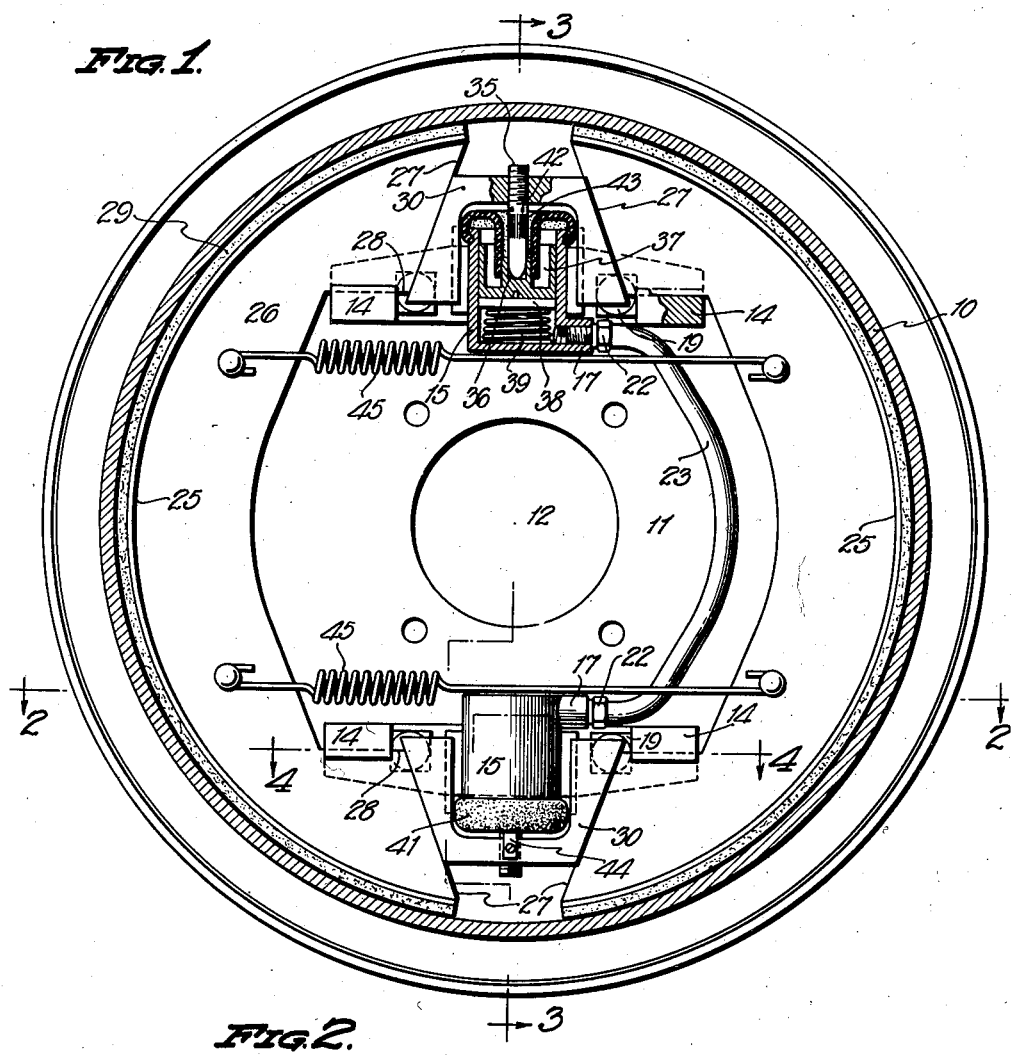
Figure 1 is a vertical sectional view of my improved brake.
Figure 2:
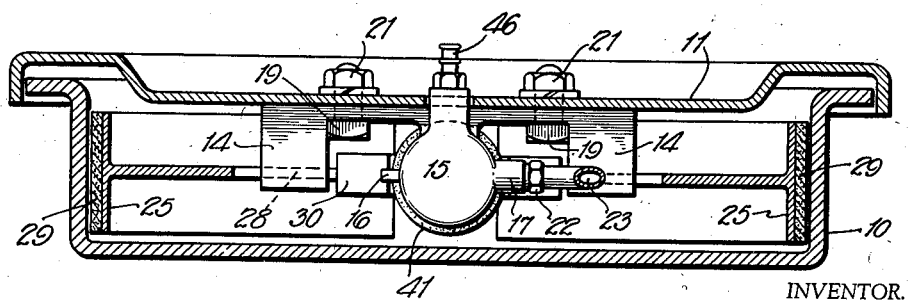
Figure 2 is a horizontal sectional view on the line 2—2 of Figure 1.

Referring to the drawings by reference characters, the numeral 10 designates a conventional brake drum adapted to be fixedly attached to the inner side of a vehicle wheel, while closing the inner open side of the brake drum, is a fixed anchor plate 11. The anchor plate 11 is provided with a central opening 12 for the passage of an axle and fixedly secured to the inside of the anchor plate above and below the opening 12 are the hydraulic actuating devices presently to be described.

Each of the hydraulic actuating devices includes an elongated attaching plate 13 having inwardly-extending guide lugs 14—14 adjacent opposite ends thereof. Formed integral with the plate 13 and disposed on the same side thereof as the lugs 14—14 is a vertically disposed cylinder 15, one end of which is closed while the opposite end is open. Extending outwardly from opposite sides of the cylinder 15 are keys or flanges 16, while formed integral with the cylinder and extending outwardly adjacent the closed end thereof is an internally screw threaded nipple 17. The attaching plate 13 intermediate the cylinder 15 and the lugs 14 is provided with bolt openings 18.

As before mentioned, the hydraulic actuating devices are respectively disposed above and below the opening 12 and are positioned in reverse relation so that the closed ends of the cylinders 15 extend inwardly and the open ends outwardly. The attaching plate 13 of each hydraulic unit fits flat against the inside of the plate 11 and is secured thereto by bolts 19 passing through the openings 18 and alined openings 20 in the plate 11. The head ends of the bolts 19 are disposed on the inside and a flat side of each head abuts the inner side of one of the guide lugs 14 to prevent accidental rotation of the bolts which might be caused by vibration. The outer threaded end of the bolt receives a clamping nut 21. With the hydraulic units mounted in this relation, the nipples 17 extend in the same direction and are joined by unions 22 with a connecting pipe 23.

The outwardly disposed face of each of the guide lugs 14 is provided with a groove or channel 24 for receiving and guiding the brake shoes now to be described.

Arranged within the drum 10 is a pair of diametrically opposed semi-circular shaped brake shoes 25—25, the combined peripheries of which substantially encompass the brake drum 10, although a small space always exists between the adjacent ends of the shoes. The brake shoes 25 are identical in construction and a description of one will suffice for the other. Each brake shoe includes an inwardly extending web 26, the ends of the web terminating in inwardly inclined faces 27. The web 26 is provided with straight parallel edges 28 which extend inwardly from the beveled edges 27 and it is these edges 28 which are slidably received in the grooves 24 of the guide lugs 14 for the purpose of supporting and guiding the brake shoes to their expanded and retracted position. The periphery of each brake shoe 25 is provided with the usual brake lining 29 for contacting engagement with the inner wall of the brake drum 10. By reference to Figure 1 of the drawings, it will be seen that the adjacent inwardly beveled edges 27 diverge inwardly to provide substantially V-shaped spaces between the adjacent ends of the brake shoe and disposed within these spaces are wedge members 30.

Each wedge member 30 is formed with a recess 31 extending inwardly from its inner end and imparts a yoke appearance to the wedge member in order that the same may straddle a cylinder 15. The inner side walls of the recess 31 are provided with grooves 32 for receiving the keys 16 extending radially from the cylinder 15. The outer sides of the wedge member 30 are beveled as at 33, and which surfaces converge in an outward direction in order to flatly contact adjacent beveled surfaces 27 of the brake shoes. The outer end or bridge portion of the yoke shaped wedge member 30 is provided with a screw threaded opening 34 for threadedly receiving the outer end of a stem or piston rod 35. The inner end of the piston rod seats in a socket 36 provided centrally within a piston 37, the inner end of the piston being provided with a rubber piston cup 38. A spring 39 is interposed between the cup 38 and the closed end wall of the cylinder and has a tendency to normally hold the piston in a position clear of the passage leading to the nipple 17. In the uppermost hydraulic actuating unit, the spring 39 also prevents the piston from closing the inlet passage 40 which extends through a nipple 41 to which the supply pipe of the fluid actuating medium is connected. Secured to the open end of the cylinder 15 in each instance is a rubber boot 41, the same also being connected to the piston 37 in order to seal the open end of the cylinder against leakage.

In order to effect adjustment of the wedge member 30 to compensate for any wear between the wedge member and the surfaces 27 of the brake shoes, the stem is provided with radial openings 42 into which a tool may be inserted for imparting a turning movement to the piston stem 35, thus feeding the wedge member 30 to the desired adjusted position depending upon the direction of rotation imparted to the piston stem 35. Means is also provided for preventing accidental rotation of the piston stem 35, which includes vertically disposed teeth 43 on the stem 35 which are engaged by a resilient catch member 44 fixed to and extending inwardly from the bridge portion of the wedge member 30.

For the purpose of normally holding the brake shoes 25 in a retracted position, and for returning them to such position after an expansion movement, the webs 26 of the brake shoes are connected together by springs 45.

From the foregoing description, it will be seen that the normal position of the parts are as shown in Figure 1 of the drawings and that the upper cylinder 15 is directly fed with a fluid from the source of supply of a hydraulic system, the upper and lower cylinders 15 being in communication through the connecting pipe 23. Upon application of the brake mechanism, the fluid is forced into the cylinders, and the pressure thereof causes outward movement of the pistons 37, thus moving the wedges 30 outwardly in opposite directions. This outward movement of the wedge members effects an expansion of the brake shoes 25 into frictional engagement with the brake drum 10, thus applying the brakes to retard rotation of the wheel on which the brake drum is mounted. So long as the fluid is under pressure within the cylinders, the brake shoes will remain expanded, but upon release of such pressure, the springs 45 tend to return the shoes to normal position, and in so doing the wedge members 30 and pistons 37 are accordingly returned to normal position.

In hydraulic systems, it becomes necessary at times to bleed the system of air which may be present therein, and for this purpose the lower cylinder 15 is provided with an outwardly extending bleeder valve 46 through which air within the system may be extracted.

By reason of the novel arrangement of the wedge members and hydraulic cylinders, it is possible to construct the brake shoes 25 to engage substantially the entire inner periphery of the brake drums, thus increasing the efficiency of the brakes over those hereinbefore known to me. The construction of the cylinder and brake shoe guides in a single unit permits of the expeditious assembly of the parts and of repairs thereto when necessary.

In Figure 6 of the drawings, I have shown a slightly modified construction for supporting and guiding the brake shoes during their movements to extended and retracted positions. In this modified disclosure, a portion of a brake shoe is shown at 25' and the web adjacent each end of the brake shoe is provided with an elongated slot 24' and receives an outwardly extending lug 14' which projects inwardly from a bracket 13'. The lug 14' is shouldered to engage the inner side of the web while a cotter pin 47 passes through the lug 14' beyond the outer side of the web to hold the shoe in position. The lug 14' is of a length less than the length of the slot 24' to enable the desired limited sliding movement of the brake shoe to extended and retracted positions. The structure is the equivalent to the channeled lug 14 shown in the preferred form, and other equivalent structures for slidably supporting the brake shoes may be substituted for those herein shown and described.

Although I have described my improved brake construction as being operable by the hydraulic means, it is understood that the fluid medium may either be liquid or air.

While I have shown and described what I consider to be the most practical embodiment of my invention, I wish it to be understood that such changes as come within the scope of the appended claims may be resorted to if desired.

Having thus described the invention, what I claim as new and desire to secure by Letters Patent of the United States, is:—

1. In a brake, a drum, a fixed anchor plate closing one side of said drum, a pair of horizontally disposed brackets fixedly secured to the inside of said anchor plate and respectively disposed at opposite sides of the axis thereof, a pair of diametrically opposed brake shoes slidably supported by said brackets, the ends of said brake shoes being inwardly inclined and adjacent ends being disposed in spaced relation, hydraulic cylinders mounted on said brackets and disposed intermediate adjacent ends of said brake shoes, pistons slidably supported in said cylinders, piston rods loosely engaging said pistons and extending outwardly beyond said cylinders, yoke shaped wedge members engaging adjacent inclined ends of said brake shoes and straddling said cylinders and slidably connected thereto, thread connections between the wedge members and the respective piston rods, and springs connecting said opposed brake shoes and tending to normally hold them in retracted position.

2. In a brake, a drum, a fixed anchor plate closing one side of said drum, a pair of horizontally disposed brackets fixedly secured to the inside of said anchor plate and respectively disposed at opposite sides of the axis thereof, a pair of diametrically opposed brake shoes slidably supported by said brackets, the ends of said brake shoes being inwardly inclined and adjacent ends being disposed in spaced relation, hydraulic cylinders mounted on said brackets and disposed intermediate adjacent ends of said brake shoes, pistons slidably supported in said cylinders, piston rods loosely engaging said pistons and extending outwardly beyond said cylinders, yoke shaped wedge members engaging adjacent inclined ends of said brake shoes and straddling said cylinders and slidably connected thereto, thread connections between the wedge members and the respective piston rods, and springs connecting said opposed brake shoes and tending to normally hold them in retracted position, and releasable catch means for preventing accidental turning of said piston rods relative to their respective related wedge members.

3. In a brake, a rotatable drum, a fixed anchor plate closing one side of said drum, a pair of brackets secured to the inside of said anchor plate and respectively disposed on opposite sides of the axis of said anchor plate, a pair of diametrically opposed brake shoes slidably supported by said brackets, the adjacent ends of said brake shoes terminating in spaced relation and being inwardly beveled, a pair of wedge members, there being one wedge member interposed between each two adjacent ends of said brake shoes for wedging engagement with the beveled ends thereof, a pair of hydraulic actuating devices fixedly supported by the respective brackets each hydraulic actuating device including a cylinder, a piston and a piston rod, the piston rods of the devices being respectively connected to said wedge members, key means between said wedge members and their related cylinders for slidably supporting and guiding said wedge members, and springs connecting the opposed brake shoes together to normally hold the same in a retracted position.

4. In a brake, a rotatable drum, a fixed anchor plate closing one side of said drum, a pair of diametrically opposed brake shoes slidably supported upon said anchor plate, the ends of said brake shoes terminating in spaced relation and being inwardly inclined, a pair of opposed hydraulic actuating devices, each including a cylinder, a piston, and a piston rod, a pair of yoke shaped wedge members respectively interposed between adjacent inclined ends of said brake shoes in contacting engagement therewith, said yoke shaped wedge members straddling the respective cylinders and slidably keyed thereto, means adjustably connecting said wedge members to the respective piston rods, and springs connecting said brake shoes together and tending to normally hold the same in retracted position.

5. In combination, a pair of brake shoes having inwardly inclined ends arranged in spaced relation, a hydraulic brake actuating unit including an attaching plate, a cylinder integral with said attaching plate and disposed between the spaced ends of said brake shoes, a piston within said cylinder, a piston rod operable by said piston and extending beyond said cylinder, a slidable yoke shaped wedge member straddling said cylinder and connected to the outer end of said piston rod, the outer sides of said wedge member engaging the inclined ends of said brake shoes, and means between said yoke shaped wedge member and said cylinder for guiding the wedge member during its sliding movements.

6. In a brake, a rotatable drum, a fixed anchor plate closing one side of said drum, a pair of diametrically opposed brake shoes slidably supported upon said anchor plate for movement to expanded and retracted position relative to said drum, the ends of the brake shoes terminating in spaced relation and being inwardly inclined, a pair of opposed hydraulic actuating devices, each of said actuating devices including a cylinder, a piston and a piston rod, a pair of wedge members respectively interposed between adjacent inwardly inclined ends of said brake shoes in sliding contacting engagement therewith, thread connections between the wedge members and the respective piston rods, said wedge members having grooves therein, means seated in said grooves for guiding said wedge members during their sliding contacting engagement with the inclined ends of said brake shoes, and springs connecting said brake shoes together and tending to normally hold the same in a retracted position.

GENE NAPOLITAN.